United States Patent [19]  
Bentley et al.

[11] 4,229,339  
[45] Oct. 21, 1980

[54] PROCESS FOR THE PREPARATION OF POLYMER DISPERSIONS

[75] Inventors: John Bentley; Morice W. Thompson, both of Maidenhead; Auguste L. L. Palluel, Windsor, all of England

[73] Assignee: Imperial Chemical Industries Limited, London, England

[21] Appl. No.: 795,307

[22] Filed: May 9, 1977

[30] Foreign Application Priority Data

May 12, 1976 [GB] United Kingdom ............... 19487/76

[51] Int. Cl. ............................... C08k 5/01; C08k 5/03
[52] U.S. Cl. .................................. 260/34.2; 525/176; 525/183
[58] Field of Search ........... 260/859 R, 34.2, 857 UN, 260/857 D, 860, 873, 858

[56] References Cited

U.S. PATENT DOCUMENTS

| | | | |
|---|---|---|---|
| 3,390,206 | 6/1968 | Thompson | 260/875 |
| 3,532,663 | 10/1970 | Nicks | 260/34.2 |
| 3,634,303 | 1/1972 | Vandenberg | 260/34.2 |
| 3,917,741 | 11/1975 | McGarr | 260/859 R |
| 3,925,295 | 12/1975 | Osborn | 260/34.2 |
| 3,981,839 | 9/1976 | Asher | 260/34.2 |
| 4,000,218 | 12/1976 | Critchfield | 260/858 |
| 4,059,557 | 11/1977 | Bentley | 260/34.2 |

*Primary Examiner*—Paul R. Michl  
*Attorney, Agent, or Firm*—Cushman, Darby & Cushman

[57] ABSTRACT

A dispersion of a condensation polymer in an organic liquid medium in which the polymer is insoluble is prepared by heating in the liquid medium one or more appropriate reactants one of which is present in the liquid disperse phase of an emulsion of which the continuous phase is constituted by the said liquid medium, in the presence dissolved in the liquid medium of a single-chain polymeric material of molecular weight between 1000 and 20,000 which carries at least one reactive group capable of taking part in the condensation polymer-forming reaction.

16 Claims, No Drawings

PROCESS FOR THE PREPARATION OF POLYMER DISPERSIONS

This invention relates to a process for the preparation of polymers in an organic liquid medium and especially to dispersions of condensation polymers as hereinafter defined formed from at least one reactant which is insoluble in the liquid medium.

By "condensation polymers" we mean polymers in which the links between the reactants which form the polymer involve atoms other than carbon and in which a low-molecular weight by-product is eliminated during the polymerisation reaction. Such polymers include, for example, polyesters and polyamides.

Methods have already been proposed for the preparation of dispersions of condensation polymers in organic liquids which are non-solvents for the polymers, employing as starting material one or more polymer-forming reactants which also may be insoluble in the organic liquid. In U.S. Pat. No. 3,925,295, there is described a process for making dispersions of condensation polymers in an organic liquid medium by heating in that medium at least one polymer-forming reactant which is insoluble therein and which itself either is a liquid at room temperature or can be melted by heating in the liquid medium so as to be in the liquid state at the temperature at which the condensation reaction takes place. Such a liquid reactant is emulsified in the organic liquid medium, before the start of the reaction, with the aid of an emulsifying agent which is a copolymer containing chain-like components of two types, one type being soluble in the liquid disperse phase of the emulsion (the polymer-forming reactant) and the other type being soluble in the liquid continuous phase (the organic liquid medium). The use of such copolymers as emulsifying agents is broadly described in U.S. Pat. No. 3,532,663; for the purpose of producing a condensation polymer dispersion, it is further necessary that one of the chain-like components of the copolymer which is soluble in the disperse phase should also be capable of associating with the condensation polymer product so as to stabilise the particles of the latter against flocculation.

In U.S. Pat. No. 3,981,839 there is described a modification of the above process in which a polymer-forming reactant insoluble in the dispersion liquid is dissolved in a second, inert liquid which is substantially immiscible with the liquid medium in which the polymer dispersion is to be produced, and the resulting solution of the reactant is emulsified in the liquid medium before heating to effect the condensation reaction. The second, solvent, liquid is removed by distillation either during or subsequent to the reaction.

In both of these previously proposed processes, the copolymer emulsifying agent used is a pre-formed substance, in which both the required types of chain-like component are already present. We have now found, however, that these processes can alternatively be performed using, instead of the preformed emulsifying agent, a low molecular weight polymeric material which is soluble in the organic liquid that is to become the continuous phase of the dispersion and which carries a reactive grouping capable of participating in the condensation polymerisation reaction.

Thus according to the present invention there is provided a process for the preparation of a dispersion of a condensation polymer as hereinbefore defined in an organic liquid medium in which the polymer is insoluble, the process comprising heating in the said liquid medium at the polymerisation temperature one or more condensation polymer-forming reactants, the reactant or at least one of the reactants being present in the liquid disperse phase of an emulsion of which the liquid continuous phase is constituted by the aforesaid liquid medium, there being also present dissolved in the said liquid medium a polymeric material having a single polymer chain of molecular weight between 1000 and 20,000 which carries at least one reactive group capable of taking part in the condensation polymer-forming reaction.

By referring to the polymer as being "insoluble" in the organic liquid medium we mean that it is sufficiently immiscible therewith to form a separate phase.

A polymer-forming reactant which is present in the process of the invention in an emulsified disperse phase may be a reactant which is liquid at normal temperatures, or a reactant which can be melted by heating in the organic liquid medium in which the dispersion is to be formed to a temperature not higher than the polymerisation temperature. It may alternatively be a solid which cannot be melted at the temperature of reaction, but which can be dissolved in a second, inert, liquid which is substantially immiscible with the organic liquid medium in which the dispersion is to be formed, in which case the resulting solution of the reactant constitutes the liquid disperse phase of the emulsion which is formed during the carrying out of the process. It is not essential that such a solid reactant should be soluble in the chosen second liquid at room temperature, but it should be sufficiently soluble therein at the reaction temperature to ensure that no solid phase material remains when reaction commences. It is also not essential that the reactant which is present as a liquid disperse phase should have a negligible solubility in the continuous phase (the liquid medium in which the dispersion is to be formed), although in the majority of cases this will in practice be the situation. However, where the reactant in question is appreciably soluble in the organic liquid dispersion medium, its partitioning in the emulsion should be strongly in favour of the disperse phase (i.e. the second liquid).

The condensation polymer-forming reactant or reactants may in general be either monomeric compounds or very low polymers comprising a small number of repeating units of the type occurring in the final disperse polymer. Where the polymer-forming reaction involves more than a single reactant which is to be present in an emulsified liquid disperse phase, each such reactant may provide a distinct liquid disperse phase, and where more than one of the disperse phases consists of an emulsified solution of a reactant in a second inert liquid, the same inert liquid may be employed for all the reactants or alternatively each reactant may be dissolved in a different inert liquid immiscible with the liquid medium of the dispersion, as described in U.S. Pat. No. 3,981,839.

Where the polymer-forming reaction involves two or more reactants, it is not necessary that all these should initially be present, or be capable of being present, in the reaction mixture as emulsified liquid disperse phases. For example, such reactants may be added gradually as the reaction proceeds, and they may be soluble in the organic liquid medium of the dispersion. However, any addition of further reactants to the pre-formed emulsion is preferably carried out under conditions of rigorous shearing and at such a rate that reaction to give the desired polymer takes place without the emulsion becoming unstable.

Typical polymer-forming reactants for use in the present invention include polyacids and reactive derivatives thereof such as anhydrides and acid halides. These may be reacted with polyols to form polyesters or with polyamines to form polyamides.

Examples of suitable polyacids or derivatives thereof include adipic acid, azelaic acid, succinic anhydride, isophthalic acid, terephthalic acid, trimellitic acid, pyromellitic acid, 1:3- and 1:4-cyclohexane dicarboxylic acids and mixtures thereof, as well as inorganic acids such as orthophosphoric acid.

Suitable polyols include ethylene glycol, propylene glycol, diethylene glycol, dipropylene glycol, trimethylene glycol, tetramethylene glycol, hexamethylene glycol, tetramethyl ethylene glycol, neopentyl glycol, trimethylol-propane, glycerol, 1:2:6-hexane triol, 1:3- and 1:4-cyclohexane diol and p-xylylene glycol, as well as hydroquinone and other polyhydric phenols. Polyether glycols, such as polyethylene glycol (e.g. of molecular weight 200) and polypropylene glycol, are also suitable.

Suitable polyamines include ethylene diamine, hexamethylene diamine, N,N$^1$-dimethylhexamethylene diamine, decamethylene diamine, diethylene triamine, piperazine, p-xylylene diamine, and phenylene diamines.

Other suitable polymer-forming reactants include diaryl carbonates such as diphenyl carbonate, and bisphenols, such as diphenylolpropane, which can react together to form aromatic polycarbonates; also diaryl carbonates and aliphatic or aromatic diamines, such as hexamethylene diamine or p,p'-diaminodiphenyl ether, which can react together to yield aliphatic or aromatic polyureas. Yet a further group of suitable reactants are phenols, such as phenol, p-cresol, the xylenols and o-phenylphenol, and formaldehyde or substances yielding or equivalent to formaldehyde such as paraform or trioxane, which can react together to produce curable phenol-formaldehyde oligomers.

Single polymer-forming reactants may also be employed, such as 11-amino-undecanoic acid for the production of nylon 11, ω-hydroxydecanoic acid for the production of poly(oxydecanoate) and p-acetoxybenzoic acid for the production of poly(p-oxybenzoate). Preformed reaction products of a polyacid and a polyol or a polyamine may also be used as a single polymer-forming reactant, e.g. bis(hydroxy-ethyl) terephthalate or hexamethylene diammonium adipate (nylon 66 salt).

Organic liquids which are suitable for use as the medium which is to become the continuous phase of the dispersion will in general, because of the relatively polar nature of most condensation polymers, be non-polar in character. Particularly suitable are hydrocarbon liquids, including the aliphatic and aromatic hydrocarbons, for example hexane, heptane, octane, cyclohexane, benzene, toluene, xylene and mesitylene, and mixtures of these including commercially available petroleum distillate fractions having boiling ranges up to about 350° C. and containing up to about 90% of aromatic hydrocarbons. Other suitable organic liquids are the chlorinated hydrocarbons, for example carbon tetrachloride, tetrachlorethane, pentachlorethane, chlorobenzene, dichlorobenzene and trichlorobenzene. The liquid medium may be a single liquid in which the polymer is insoluble, or a mixture of two or more liquids which may include minor proportions of liquids in which the polymer is soluble, provided that the polymer is insoluble in the mixture as a whole. The liquid medium should have a boiling point which is not lower than the temperature of the polymer-forming reaction.

Where the process of the invention is carried out with the aid of a second liquid as hereinabove described, for the purpose of dissolving the insoluble polymer-forming reactant and emulsifying the resulting solution, that second liquid will usually be polar in character since it is required to be a solvent for the reactant, which will generally itself be polar. Where the first liquid, i.e. the liquid which is to become the continuous phase of the dispersion, is an aliphatic hydrocarbon, or a predominantly aliphatic hydrocarbon mixture, suitable polar second liquids include lower alcohols and glycols, such as methanol, ethylene glycol, butane diol, xylylene glycol, propylene glycol, butane triol, trimethylolpropane, cyclohexane diol, triethanolamine, formamide, dimethyl-formamide, and monohydric phenols and their substituted derivatives. Where the first liquid is an aromatic hydrocarbon mixture or is a chlorinated hydrocarbon, suitable polar second liquids include water and lower glycols such as ethylene glycol and propylene glycol.

The second liquid may have a boiling point which is either higher or lower than that of the first liquid. However, when the second liquid has the higher boiling point, it is necessary that it should be capable of forming an azeotrope of boiling point not higher than the boiling point of the first liquid, in order that it may be separated from the first liquid. Such an azeotrope may be formed by the second liquid with the first liquid, or with one component of the first liquid where the latter is a mixture, or it may be formed by the second liquid with the low molecular weight by-product of the polymer-forming reaction so that both these materials, which are unwanted in the final polymer dispersion, are eliminated together from the reaction mixture. It may be convenient in many cases if an azeotrope containing the second liquid separates into its constituents on standing; this will render recovery of the second liquid easier, which may be desirable if the second liquid is a relatively expensive special solvent selected because of its power to dissolve the polymer-forming reactant.

When the second liquid is not capable of forming an azeotrope either with the first liquid or with the reaction by-product, it is sufficient if the second liquid has a lower boiling point than the first liquid so that it may be separated from the latter by fractional distillation.

If the by-product of the polymer-forming reaction does not form an azeotrope with the second liquid, it is preferred that it should form an azeotrope with the first liquid or a component thereof so as to assist its removal from the reaction mixture.

If desired, the process of the invention may be operated under superatmospheric pressure as a means of controlling the boiling points of liquids which are otherwise suitable as either the first liquid or the second liquid; in the foregoing discussion, therefore, the references to boiling points and azeotrope formation are to be understood as being applicable to operation under either normal or superatmospheric pressure conditions as appropriate.

The second liquid may be either a solvent or a nonsolvent for the polymer produced.

The other essential constituent, in the process of the invention, is, as already stated, a polymeric material having a single polymer chain of molecular weight between 1000 and 20,000 which carries at least one reactive group capable of taking part in the condensation polymer-forming reaction, the polymeric material being soluble in the organic liquid medium. By defining that the polymeric material has a single polymer chain we mean to distinguish it from the polymeric emulsifying agents which are described in U.S. Pat. Nos. 3,925,295 and 3,981,839 and which optionally carry groups capable of participating in a condensation polymerisation reaction. Such emulsifying agents are, as stated above, characteristically block or graft copolymers containing two different types of chain-like component, one of which is soluble in the polymer-forming reactant and the other of which is soluble in the organic liquid medium in which the polymer dispersion is to be prepared. The polymeric materials for use in the process of the present invention contain only one type of chain-like component, namely the type which is soluble in the organic liquid medium constituting the continuous phase of the emulsion initially formed. The single polymer chain in question can be either a homopolymer or a random copolymer, but it cannot be a block or graft copolymer.

Polymeric materials satisfying these requirements will, for the already-stated reason that the organic liquid medium is usually non-polar in character, also in general be derived from essentially non-polar polymers or copolymers, for example unsaturated hydrocarbon polymers, polymers of higher fatty esters of unsaturated acids and polyesters obtained by self-condensation of long-chain fatty acids containing hydroxyl groups. The nature of the reactive group present which is capable of participating in the condensation polymer-forming reaction will depend on the particular type of condensation polymer being prepared, and it may be identical with the reactive group present in one of the polymer-forming reactants. Thus, for example, where the condensation polymer is a polyester, suitable reactive groups are hydroxyl and carboxyl groups, and, where the polymer is a polyamide, suitable reactive groups are amino and carboxyl groups. However, it is preferred that the reactive group is one which is especially capable of reacting rapidly together with the polymer-forming reactant or reactants. In the preparation of either polyesters, polyamides or polyesteramides, that is to say where the polymerisation reaction involves amino and-/or hydroxyl groups together with carboxyl groups, or chemical equivalents thereof, the following reactive groups are inter alia suitable:

Anhydride Groups

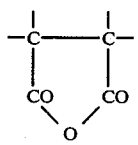

(e.g. substituted succinic anhydroxide residues obtained by maleinisation of unsaturated materials; copolymers of (meth)-acrylic anhydride; copolymers of maleic or itacomic anhydride)

or

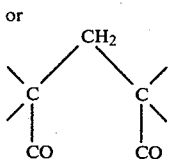

or —CO . O CO CH₃   (mixed carboxylic/active anhydrides)

Epoxide Groups

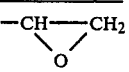

Oxetane Groups

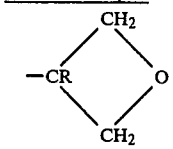

Lactone Groups

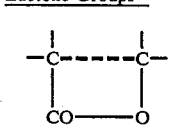

Azelactone Groups

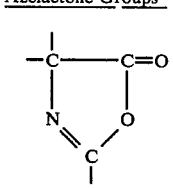

N-Carboxyanhydride Groups

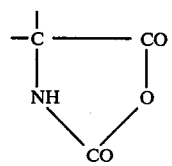

Isocyanate (—NCO), isothiocyanate (—NCS), azide (—CON₃), azidoformate (—O.CON₃), reactive ester (e.g. —COOCH₂CN) and substituted urea (—NH-.CONH₂) groups are other examples of suitable fast-reacting groups.

In accordance with the foregoing illustrations, examples of suitable polymeric materials containing at least one reactive group include: maleinised polybutadienes of molecular weight 1500–2000 containing on average approximately 1 succinic anhydride residue per polymer chain; polymers of ethylenically unsaturated monomers having terminal functional groups made by free radical polymerisation of monomer in the presence of an initiator and a chain transfer agent both of which contain the desired functional group, as described in U.S. Pat. No. 3,390,206; addition polymers made by anionic polymerisation of monomer, for example, tertiarybutyl styrene, with termination of the "living polymer" by reaction with epichlorhydrin or chloromaleic anhydride, as described in U.S. Pat. Nos. 3,786,116 and 3,832,423; the product of reacting the sodium salt of poly(12-hydroxystearic acid) of molecular weight 1450–2000 with epichlorhydrin, whereby the terminal —COONa group of the polymeric acid salt is esterified and a terminal epoxide group is introduced instead.

The proportion used, in the process of the invention, of the polymeric material containing a reactive group may vary from 0.1% to 25%, preferably from 0.5% to 25%, based on the weight of the final polymer. The optimum proportion to be used in any particular instance will depend principally upon the particle size which is required in the final dispersion, although that result will also be influenced by other factors such as the degree of agitation of the reaction mixture during polymerisation. The person skilled in the art will readily find by simple experiment the best reaction conditions for achieving any desired result.

The concentration of the polymer-forming reactant or reactants which can be used in the process may vary widely, but in general it will be from 10% to 80% by volume based on the total reaction mixture. Where a second inert liquid is employed as a solvent for a polymer-forming reactant prior to emulsification, this will usually be present in an amount such that the concentration of the reactant in it is from 10% to 90% by weight; the maximum concentration attainable in the second liquid may be limited by the need to keep the viscosity of the solution sufficiently low to permit its efficient emulsification in the first liquid.

Whilst it is not intended that the scope of the present invention should be limited by reference to any theory of its mode of operation, we believe that the role of the polymeric material having a single polymer chain of molecular weight between 1000 and 20,000 and carrying at least one reactive group is that of a "precursor" for the formation of an emulsifying agent for the liquid disperse phase of the reaction mixture, and also of a polymeric stabiliser whereby the disperse polymer is sterically stabilised. By virtue of the reactive group, which participates in the polymer-forming reaction, it is probable that, at a very early stage in the reaction, there are grafted onto the single polymer chains of the "precursor" (which is by definition soluble per se in the organic liquid medium of the dispersion) structural units identical to those of which the disperse polymer itself is to consist. Further such units will add on as polymerisation proceeds, forming second chains which will tend to be per se insoluble in the liquid medium and to have an affinity for both the polymer-forming reactant or reactants and the disperse polymer subsequently formed; thus the resulting graft copolymer is able to act as an emulsifying agent for the liquid disperse phase of the reaction mixture and its soluble chains ultimately become "anchored" to the surface of the disperse polymer particles so as to form a barrier around the particles, preventing them flocculating.

Dispersion of condensation polymers obtained by the process of the invention are thus stable on storage; over a period of time, gravity settlement of the disperse particles may occur but the material which settles out can easily be redispersed by shaking or stirring. The dispersions are useful for the production of coatings upon such substrates as glass fibre and textile materials, by evaporation of the organic liquid medium following application of the dispersion to the substrate; where the disperse polymer is capable of undergoing a subsequent cross-linking reaction, as for example in the case of a phenol-formaldehyde oligomer, the substrate and coating may subsequently be subjected to a heating operation to cure the polymer. For such coatings applications, other film-forming materials may if desired be blended with the dispersions obtained according to the invention. Alternatively, the dispersions may be converted into polymer powders by evaporation of the continuous phase or by filtration, decantation or centrifugation, depending on the particle size of the disperse phase. The powders so obtained may be used, for example, in the manufacture of moulded articles or of fibres, and as powder coatings. The powder particles may also be incorporated, by blending in solution or in the melt, into other polymeric materials suitable for moulding or film-forming applications, so as to modify, for example, their impact resistance.

The invention is illustrated but not limited by the following Examples in which parts are by weight:

EXAMPLE 1

To a reaction vessel equipped with a mechanical stirrer, a mechanical emulsifier head, a steam-heated fractionating column carrying a Dean and Stark separator and a thermometer was charged the following:
Phthalic anhydride—500 g
Maleinised polybutadiene (see below)—149 g
Ethylene glycol titanate—0.6 g
Aliphatic hydrocarbon, boiling range 190°–210° C.—950

The charge was heated with stirring and, when the temperature had reached about 140° C., the emulsifier head was started. At a temperature of 160° C., when the charge had the appearance of a brown solution or coarse emulsion, the following feed was added over a period of about 5 minutes:
Polyethylene glycol mol wt. 200—419 g
Ethylene glycol—42.5 g
Trimethylolpropane—68 g At the end of the addition, the batch reached the reflux temperature of 185° C. and over the next 5–10 minutes was seen to become white as the production of a fine emulsion took place. After 3 hours' heating at reflux temperature, when 36 ml of distillate had been removed, the steam supply to the fractionating column was turned off; heating was then continued. After a total of 7 hours' heating, examination of the batch under the optical microscope showed it to be a dispersion of particles of size 3–10 microns. After further heating up to a total of 14 hours, when a total amount of distillate of 74 mls had been removed (theoretical amount 75 ml), the resulting dispersion of polyester had a particle size range of 1–10 microns. The particles were swollen by, but were not soluble in, acetone; a determination of the acid value of the polyester carried out in the presence of acetone gave a result of 35 mg KOH/g. The molar ratios of the constituents were: phthalic anhydride/polyethylene glycol/ethylene glycol/trimethylolpropane 1/0.62/0.20/0.15. The product was fluid and stable towards flocculation; although the disperse polymer tended to settle over a period of some days, it was easily redispersed by stirring.

The maleinised polybutadiene used in the above procedure was made by reacting polybutadiene, having a molecular weight of 1500–2000 and comprising 45% of 1:2 structure, with maleic anhydride in the weight proportions of 93:7. This produced the equivalent of 1.15 maleic anhydride residues for each polybutadiene molecule of weight 1500.

EXAMPLE 2

To a reaction vessel, equipped as described in Example 1 but without the mechanical emulsifying head, was charged the following:
Phthalic anhydride—666 g
Maleinised polybutadiene (as in Example 1)—92 g
Tertiary Butyltitanate—0.7 g Aliphatic Hydrocarbon (boiling range 190°–210° C.)—950 g The charge was heated with stirring. When the temperature had reached about 155° C., the charge having the appearance of a brown solution or a coarse emulsion, the following feed was added over a period of about 5 minutes:

Ethylene glycol—250 g
Trimethyl propane—60 g

Over the next 10 minutes, by the end of which time the batch had reached initial reflux at 170° C., the batch was seen to whiten as the production of an emulsion took place. After 3 hours heating, when 73 g of distillate had been removed, the steam supply to the fractionating column was turned off. Heating of the batch was continued for a total of 12 hours, when a total of 90 g distillate comprising 80 g water and 10 g ethylene glycol had been removed. The resulting dispersion had a particle size range of 3–30μ and a determination of the acid value in the presence of acetone gave a result of 41 mg KOH/g. The molar ratios of reactants used were: phthalic anhydride/ethylene glycol/trimethylol propane 1/0.85/0.1. The product was stable and fluid; though settling fairly rapidly, the disperse polymer was easily redispersed by gentle agitation.

EXAMPLE 3

A modified polybutadiene chain-terminated at one end by a glycidyl ether grouping was prepared by the following method, using as starting material a monohydroxy-terminated polybutadiene commercially obtainable under the name "Lithene N105" ("Lithene" is a Registered Trade Mark) from Revertex Limited, U.K. This starting material had a molecular weight as determined by gel permeation chromatography (with polystyrene calibration) of 12,000. This polymer (150 g) was reacted with epichlorhydrin (4.2 g, 1 molar equivalent based on the hydroxyl content of the polymer) in the presence of boron trifluoride etherate at 70° C. Following deactivation of the boron trifluoride with sodium hydroxide, a further addition of epichlorhydrin (16.8 g) was made at 70° C. Sodium hydroxide (1.8 g) was then added and the reaction mixture was heated to 126° C. to achieve ring closure to form the glycidyl ester. Following filtration to remove sodium chloride and distillation to remove excess epichlorhydrin, a polymeric glycidyl ester having an epoxide equivalent of 15,800 was obtained.

Using the apparatus described in Example 1, a polymer dispersion was then made as follows. To the reaction vessel were charged the following ingredients:

Aliphatic hydrocarbon (boiling range 190°–210° C.)—806 g
Monoglycidyl ether of polybutadiene (as described above)—125 g
Titanium-ethylene glycol complex—0.5 g
Phthalic anhydride—422 g
Ethylene glycol—34 g The mechanical emulsifier was started when the reactants had been heated to 160° C. and the following mixture (pre-warmed in order to aid mixing) was added:

Polyethylene glycol mol. wt. 200—353 g
Trimethylolpropane—57 g

The reaction batch was held at reflux temperature for 7 hours, during which time water (52 g) was removed. The acid value had then fallen to 49 mg KOH/g. The product was a fluid dispersion of polyester polymer having a particle size range of 3–40 microns.

EXAMPLE 4

The glycidyl ester of poly(12-hydroxystearic acid) was prepared by the following method, starting from a sample of the polymerised acid (obtained by self-condensation of commercial 12-hydroxystearic acid containing 11% of stearic acid) having an acid value of 35 mg KOH/g; the acid equivalent weight of this material, and hence its number average molecular weight, was 1460. The sodium salt of the polymerised acid was prepared by treatment of the latter with sodium bicarbonate, and the salt was then reacted with a ten-fold molar excess of epichlorhydrin in the presence of benzyl trimethylammonium chloride, in order to give the glycidyl ester. Following removal of sodium chloride by filtration and of excess epichlorhydrin by distillation, the glycidyl ester product was found to have an epoxide equivalent weight of 2380.

A polyester dispersion was then made, using the apparatus described in Example 1. The reaction vessel was charged with the following:

Aliphatic hydrocarbon (boiling range 190°–210° C.)—806 g
Glycidyl ester of poly(12-hydroxystearic acid) (as described above)—125 g
Titanium-ethylene glycol complex—0.5 g
Phthalic anhydride—422 g
Ethylene glycol—34 g These ingredients were heated with stirring to 160° C., and the emulsifier was started during the heating. The following pre-warmed mixture was then added:

Polyethylene glycol mol. wt. 200—353 g
Trimethylolpropane—57 g

The reaction batch was held at reflux temperature for 6 hours, during which time water (29 g) was removed and the acid value fell to 41.8 mg KOH/g. The product was a fluid dispersion of polyester particles having the size range 0.5–10 microns.

EXAMPLE 5

A random graft copolymer of lauryl methacrylate/methacrylic anhydride 97/3 by weight was made as follows. A mixture of lauryl methacrylate (322 g), methacrylic anhydride (10.3 g) and azobis(isobutyronitrile) (4.3 g) was fed over a period of 3 hours into a petroleum mixture (658 g) refluxing at a temperature of 90° C. Heating under reflux was continued for 8 hours, with further addition of azobis(isobutyronitrile) (0.4 g) until a constant solids content was achieved. Aliphatic hydrocarbon (boiling range 190°–210° C.) was then added and low-boiling diluent removed so as to yield a 30% solids content solution of copolymer. The product was found by gel permeation chromatography (polystyrene calibration) to have $\overline{M}_n = 9500$ and $\overline{M}_w = 18,000$; thus each polymer molecule had on average between 1 and 2 copolymerised methacrylic anhydride units in the chain.

To the reaction vessel of an apparatus as described in Example 1 was charged the following:

Aliphatic hydrocarbon (boiling range 190°–210° C.)—495 g
Solution of lauryl methacrylate/methacrylic anhydride copolymer (as described above)—457 g
Phthalic anhydride—444 g
Titanium-ethylene glycol complex—0.5 g This mixture was heated with stirring to 160° C., the emulsifier meanwhile being started. The following pre-warmed mixture was then added:

Polyethylene glycol mol. wt. 200—372 g
Trimethylolpropane—60 g
Ethylene glycol—37 g The reactants were held at reflux temperature for 5 hours, during which period water (34 g) was removed. The product obtained was a dispersion of polyester of particle size 1–15 microns; these particles separated out on standing but were redispersed on stirring.

EXAMPLE 6

The glycidyl ester of poly(12-hydroxystearic acid) made as described in Example 4 was converted to the 1:1 hexamethylene diamine adduct as follows. The glycidyl ester (180 g) was added dropwise over 30 minutes to a stirred mixture of hexamethylene diamine (44 g) and toluene (85 g) at room temperature (these quantities corresponded to a five-fold excess of the diamine). Reaction was completed by heating the mixture to 60° C.; excess of diamine was then removed by washing the product with a large volume of ethanol. The separated polymer layer was found to contain no free diamine; the solids content of the 1:1 adduct was 75%.

To the reaction vessel of an apparatus as described in Example 1 was charged the following:
    Aliphatic hydrocarbon (boiling range 190°–210° C.)—779 g
    1:1 Adduct solution (as described above)—121 g
    Phthalic anhydride—444 g
    Titanium-ethylene glycol complex—0.5 g
Adopting the same procedure as is described in the preceding Examples, there was added to this mixture at 160° C. a pre-warmed mixture of:
    Polyethylene glycol mol. wt. 200—372 g
    Trimethylolpropane—60 g
    Ethylene glycol—37 g
Refluxing of the initially white dispersion was continued for 6 hours, during which time water (68 g) was removed and the acid value fell to 71 mg KOH/g. The final product was a white, fluid polyester dispersion which had a particle size range of 0.3–7 microns and which was stable towards settlement on storage.

EXAMPLE 7

In this Example, the soluble polymer used was the monohydroxy-terminated polybutadiene described in Example 3, in this case not converted to the glycidyl ether derivative.

The procedure described in Example 3 was followed, except that the initial charge to the reaction vessel was:
    Aliphatic hydrocarbon (boiling range 190°–210° C.)—932 g
    Monohydroxy-terminated polybutadiene—182 g
    Phthalic anhydride—814 g
and the subsequent addition consisted of:
    Propylene glycol—426 g
    Trimethylolpropane—74 g
The total reflux period was 5 hours, during which water (65 g) was removed. Some difficulty was experienced on account of foaming of the reaction mixture. The product was a coarse polyester dispersion of particle size range 20–80 microns, which settled rapidly when agitation was stopped.

The production of a coarser dispersion in this experiment demonstrates the lower efficiency in the process of the invention of the less reactive hydroxyl group present in the soluble polymer as compared with that of the glycidyl group shown in Example 3.

EXAMPLE 8

The soluble polymer used in this Example was the same as that used in Example 6.

To a 4-liter laboratory reactor, fitted with a turbine stirrer and a reflux condenser coupled with a Dean and Starke separator, was charged:
    11-Aminoundecanoic acid—666 g
    Ethylene glycol—333 g
    Aliphatic hydrocarbon (boiling range 190°–210° C.)—1000 g
    Solution of adduct of hexamethylene diamine with the glycidyl ester of poly(12-hydroxystearic acid) (as described in Example 6, 70% solids)—120 g This mixture was heated to recycle temperature with constant stirring. At about 130° C., the 11-aminoundecanoic acid dissolved in the ethylene glycol and the resulting solution then became emulsified in the hydrocarbon. After heating under recycle for 1½ hours, during which time distillate (380 ml) consisting of the ethylene glycol and water of reaction was removed, the batch assumed the appearance of a white, milky fluid indicating the presence of emulsified particles. The product was a coarse dispersion of nylon-11 polymer.

What we claim is:

1. A process for the preparation of a dispersion of a condensation polymer in which the links between the reactants which form the polymer involve atoms other than carbon and in which a low molecular weight by-product is eliminated during the polymerisation reaction by which said polymer is made in an organic liquid medium in which the polymer is insoluble, the process comprising heating in the said liquid medium at the polymerisation temperature one or more condensation polymer-forming reactants, the reactant or at least one of the reactants being present in the liquid disperse phase of an emulsion of which the liquid continuous phase is constituted by the aforesaid liquid medium, said reactant being selected from the group consisting of a reactant which is liquid at normal temperature, a reactant which is melted by heating in the organic liquid medium at a temperature not higher than the polymerisation temperature, and a reactant which is a solid which cannot be melted at the reaction temperature and which is dissolved in a second, inert liquid which is substantially immiscible with the organic liquid medium, there being also present dissolved in the said liquid medium a polymeric material having a single polymer chain of molecular weight between 1000 and 20,000 which carries at least one reactive group capable of taking part in the condensation polymer-forming reaction, said single polymer chain being a homopolymer or a random copolymer but not a block or graft copolymer.

2. A process as claimed in claim 1, wherein the reactant which is present in an emulsified disperse phase is a reactant which is liquid at normal temperatures.

3. A process as claimed in claim 1, wherein the reactant which is present in an emulsified disperse phase is melted by heating in the organic liquid medium at a temperature not higher than the polymerisation temperature.

4. A process as claimed in claim 1, wherein the reactant which is present in an emulsified disperse phase is a solid which cannot be melted at the reaction temperature and which is dissolved in a second, inert liquid which is substantially immiscible with the organic liquid medium.

5. A process as claimed in claim 1, wherein the condensation polymer is a polyester or a polyamide.

6. A process as claimed in claim 1, wherein the reactive group carried by the polymeric material of molecular weight between 1000 and 20,000 which is soluble in the organic liquid medium is identical with the reactive group present in one of the polymer-forming reactants.

7. A process as claimed in claim 1, wherein the reactive group carried by the polymeric material of molecular weight between 1000 and 20,000 which is soluble in the organic liquid medium is a group capable of reacting rapidly with the polymer-forming reactant or reactants.

8. A process as claimed in claim 7, wherein the polymerisation reaction involves the reaction of amino and/or hydroxyl groups together with carboxyl groups, or chemical equivalents thereof, and the reactive group in the polymeric material of molecular weight between 1000 and 20,000 is selected from acid anhydride groups, epoxide groups, oxetane groups, lactone groups, azlactone groups, N-carboxyanhydride groups, isocyanate groups, isothiocyanate groups, azide groups, azidoformate groups, reactive ester groups and substituted urea groups.

9. A process as claimed in claim 8, wherein the polymeric material containing the reactive group is a maleinised polybutadiene of molecular weight 1500–2000 containing on average approximately 1 succinic anhydride residue per polymer chain.

10. A process as claimed in claim 8, wherein the polymeric material containing the reactive group is a polybutadiene of molecular weight 12,000 chain-terminated by a single glycidyl ether grouping.

11. A process as claimed in claim 8, wherein the polymeric material containing the reactive group is the glycidyl ester of poly(12-hydroxystearic acid) of molecular weight 1450–2000.

12. A process as claimed in claim 8, wherein the polymeric material containing the reactive group is a 97/3 lauryl methacrylate/methacrylic anhydride copolymer of weight average molecular weight 18,000.

13. A process as claimed in claim 1, wherein the proportion used of the polymeric material containing the reactive group is from 0.1% to 25% by weight of the disperse polymer.

14. A process as claimed in claim 13, wherein the proportion of the polymeric material is from 0.5% to 25% by weight.

15. A process as claimed in claim 1, wherein the concentration of the polymer-forming reactants is from 10% to 80% by volume of the total reaction mixture.

16. A dispersion of a condensation polymer whenever prepared by a process as claimed in claim 1.

* * * * *